United States Patent
Lutz

(10) Patent No.: US 7,950,452 B2
(45) Date of Patent: May 31, 2011

(54) ANTI-FOULING SYSTEM FOR OFFSHORE DRILLING STRUCTURES

(75) Inventor: Jeff Lutz, Tomball, TX (US)

(73) Assignee: S & N Pump Company, Houston, TX (US)

( * ) Notice: Subject to any disclaimer, the term of this patent is extended or adjusted under 35 U.S.C. 154(b) by 1172 days.

(21) Appl. No.: 11/554,745

(22) Filed: Oct. 31, 2006

(65) Prior Publication Data
US 2007/0095732 A1  May 3, 2007

Related U.S. Application Data

(60) Provisional application No. 60/732,587, filed on Nov. 2, 2005.

(51) Int. Cl.
*E21B 29/19* (2006.01)

(52) U.S. Cl. ........ 166/270; 166/266; 166/263; 166/275; 166/250.15; 166/358

(58) Field of Classification Search .................. 166/257, 166/261, 266, 268, 270, 400, 401, 269, 275, 166/272.6, 263; 175/5–10
See application file for complete search history.

(56) References Cited

U.S. PATENT DOCUMENTS

| | | | | |
|---|---|---|---|---|
| 3,652,431 A | * | 3/1972 | Reynolds | 205/338 |
| 3,724,543 A | * | 4/1973 | Bell et al. | 166/248 |
| 3,984,302 A | | 10/1976 | Freedman et al. | |
| 4,256,556 A | * | 3/1981 | Bennett et al. | 205/724 |
| 4,345,981 A | * | 8/1982 | Bennett et al. | 205/701 |
| 4,391,567 A | * | 7/1983 | Ciampolillo | 416/146 R |
| 4,776,384 A | | 10/1988 | Kawabe et al. | |
| 4,869,016 A | | 9/1989 | Diprose et al. | |
| 4,988,444 A | | 1/1991 | Applegate et al. | |
| 5,496,150 A | | 3/1996 | Claxton, III et al. | |
| 5,616,250 A | | 4/1997 | Johnson et al. | |
| 5,633,460 A | | 5/1997 | Manmaru | |
| 5,989,396 A | * | 11/1999 | Prasnikar et al. | 204/252 |
| 5,998,200 A | | 12/1999 | Bonaventura et al. | |
| 6,183,646 B1 | | 2/2001 | Williams et al. | |
| 6,244,346 B1 | | 6/2001 | Perriello | |
| 6,267,979 B1 | | 7/2001 | Raad et al. | |
| 6,719,894 B2 | * | 4/2004 | Gavrel et al. | 205/744 |
| 6,730,205 B2 | | 5/2004 | Holland | |
| 6,852,235 B2 | | 2/2005 | Holland | |
| 7,717,173 B2 | * | 5/2010 | Grott | 166/267 |
| 2004/0079689 A1 | | 4/2004 | Newman | |
| 2009/0301717 A1 | * | 12/2009 | Lunde et al. | 166/268 |

FOREIGN PATENT DOCUMENTS

JP    62228493 A  * 10/1987

OTHER PUBLICATIONS

PCT Search Report for International Application No. PCT/US06/42621, dated Oct. 1, 2007.

* cited by examiner

*Primary Examiner* — Thomas A Beach

(57) ABSTRACT

An anti-fouling system for offshore drilling structures which injects metallic ions into seawater pumping systems. An ion generator may be positioned at various positions including the strainer basket of one or more of the seawater pumps or at various positions in the system. As well, ion generators may be skid mounted and/or otherwise centrally located and connected by controllable valves to various treated water injection points, whereby the flow rates are determined and ion concentrations are maintained at desired levels throughout the system, regardless of different pumping rates.

8 Claims, 3 Drawing Sheets

ANTI-FOULING SYSTEM FOR OFFSHORE DRILLING STRUCTURES

This application claims benefit of U.S. Provisional Patent Application No. 60/732,587 filed Nov. 2, 2005.

BACKGROUND OF THE INVENTION

1. Field of the Invention

The present invention relates generally to offshore drilling structures and, more specifically, to anti-fouling ion injection systems/methods for offshore drilling structures.

2. Description of the Background

Various types of marine fouling exist, ranging from bacteria and fungi, to free swimming animal larvae. Once the larvae are allowed to enter and adhere to the interior walls of the sea water system, they begin to grow and colonize. If this natural process goes unchecked, a partial or complete blockage in the seawater piping is inevitable. The uncontrolled growth of marine fouling organisms restricts flow, creates turbulent fluid flow, reduces pressure, and causes the motor to overheat. Many cases have been reported where marine fouling has caused major damage to seawater pump systems.

Marine growth fouling in seawater pumping systems for offshore drilling structures is the cause of many operational problems. For instance, problems may include reduced pump life due to clogged intake areas, accelerated corrosion on metal surfaces after barnacles attach, compromised downstream equipment due to restricted piping manifolds, and the need for frequent cleaning of caissons, piping, and strainers. By protecting against fouling, operating and maintenance costs are reduced and the life of the offshore equipment is protected.

Alternative methods are available to combat marine growth fouling, with the most common being chlorination. Typical ways to introduce chlorine into the sea water system are Chlorine Gas Injection, Hypochlorite Injection, and In-situ production of Hypochlorite by electrolysis of seawater. However, chlorination systems involve high capital outlays. As well, the operating and maintenance costs of chlorination systems are high. Furthermore, chlorine treatment systems have additional problems such as toxicity, corrosiveness, and safety hazards.

The following prior art discloses patents that attempt to solve the above and/or related problems:

U.S. Pat. No. 6,852,235, issued Feb. 8, 2005, to Holland, discloses a method and apparatus that provide fluid treatment at a plurality of distinct points using a length of energized magnetically conductive conduit in fluid communication with non-magnetic coupling devices. The instant invention prevents the formation and accumulation of contaminants within conduits and on equipment utilized in the transportation, delivery and processing of fluid columns. It may also be utilized to accelerate the separation of oil and water and increase the efficiency of oil/water separation equipment.

U.S. Pat. No. 6,730,205, issued May 4, 2004, to Holland, discloses a method and apparatus for the treatment of fluid columns that uses an air-cooled electromagnetic field generator to prevent the deposition and accumulation of contaminants within conduits and on equipment utilized in the transportation, delivery and processing of the fluid columns. The instant invention may be utilized to accelerate the separation of oil and water and increase the efficiency of such separation apparatus.

U.S. Pat. No. 6,267,979, issued Jul. 31, 2001, to Raad et al, discloses control of biofouling in pipes or aqueous systems via the use of compositions and methods that include the combination of a chelator with an antimicrobial agent.

U.S. Pat. No. 6,244,346, issued Jun. 12, 2001, to Perriello, discloses a method and apparatus in which alkane-utilizing bacteria are used to reduce fouling of injection and recovery wells. Fouling materials such as combinations of bacteria and metal oxides that would otherwise clog the wells are prevented from depositing on the wells. In a preferred embodiment, a butane substrate and an oxygen-containing gas are injected near a well inlet or outlet to stimulate the growth of butane-utilizing bacteria which are effective at reducing or eliminating fouling of the well.

U.S. Pat. No. 6,183,646, issued Feb. 6, 2001, to Williams et al, discloses the reduction and prevention of biofouling in facilities utilizing water, e.g. sea water, carrying biological organisms, without causing corrosion, chemical reaction or other detrimental action from the additive or environmental discharge problems. Such operations include, for example, desalination plants, power plants, oilfield water injection facilities and shipboard or ocean platform fire water systems. For example, in the desalination plant of FIG. 1, the biofouling reduction method and apparatus for this invention have a source of oxidizing agent such as chlorine ions or ozone, a source of copper ions and a dosing chamber for delivery of relatively low dosage levels of oxidizing agents and at appropriate times copper ions to form a treatment additive. Flow connectors connect the dosing chamber to various points along the piping in the desalination plant. A controller controls the operation of the dosing chamber and valves along the flow connectors to operate in a sequential target dosing mode to deliver treatment additive of predetermined composition to selected points along the piping at predetermined times and in predetermined concentrations.

U.S. Pat. No. 5,998,200, issued Dec. 7, 1999, to Bonaventura et al, discloses a method for preventing fouling of an aquatic apparatus by an aquatic organism which comprises affixing a biologically active chemical to a surface intended for use in contact with an aquatic environment containing the organism, wherein the chemical is an enzyme, repellant, chelating agent, enzyme inhibitor, or non-metallic toxicant capable of hindering the attachment of the organism to the surface while affixed to the surface, along with improved apparatuses which are produced using the method.

U.S. Pat. No. 5,616,250, issued Apr. 1, 1997, to Johnson et al, discloses an improved system and novel components and methods for treating waste waters contaminated with a variety of commercial, municipal, and/or industrial contaminants. A mixing vessel according to the invention comprises upper and lower mixing chambers connected by an intermediate tubular section and a fluid exit tube running coaxially down the center of the intermediate tubular portion. The fluid stream to be treated flows in a spiral pattern vertically through the vessel, providing turbulent flow. The flow stream may be subjected to electric or magnetic fields. In one embodiment, streams of the fluid to be treated and of an ionized coagulant are combined prior to entry into the vessel; in another embodiment, the incoming flow stream is combined with the coagulants in the mixing vessel. The incoming flow may be split between annular passageways to improve mixing. Magnetite particles may be generated in situ and added to the flow stream to further encourage coagulation in the presence of a magnetic field. After exiting the mixing chamber, the coagulated contaminants may be removed using a variety of filtration steps.

U.S. Pat. No. 4,988,444, issued Jan. 29, 1991, to Applegate et al, discloses an improved process for killing and inhibiting growth and reproduction (after-growth) of microorganisms comprising adding sufficient chloramine to kill the microorganisms without oxidizing high molecular weight organics, which are not easily assimilated by organisms that survive, into lower molecular weight ones, which are easily assimilated.

U.S. Pat. No. 4,869,016, issued Sep. 26, 1989, to Diprose et al, discloses a method to provide a substantial reduction of marine corrosion in sea water by micro and macro biofouling. An alternating current is generated of a strength and frequency sufficient to shock marine biofouling organisms and sufficient to upset the normal behavior patterns of the marine biofouling organisms entrained in the sea water passing around or through the structure. A second combination of alternating and direct currents are generated between two strategically located electrodes whereby to release into the water around or within the structure controlled amounts of chlorine ions and copper ions to produce an environment actively hostile to potential marine biofouling organisms. The effect of releasing copper ions and chlorine ions simultaneously is that they co-operate in a synergistic manner that greatly enhances the biocidal effect on marine organisms over and above the effect of the separate use of copper ions and chlorine ions.

U.S. Pat. No. 4,776,384, issued Oct. 11, 1988, to Kawabe et al, discloses a method of monitoring the inner surfaces of copper-alloy condenser tubes of a condenser through which seawater flows as a coolant by controlling a ferrous-ion injecting operation to inject ferrous ions into the coolant for forming a protective film on the inner surfaces of the condenser tubes, and a sponge-ball cleaning operation to clean the inner tube surfaces by passing sponge balls through the condenser tubes. During an initial period of exposure of the condenser tubes to the coolant after installation of the condenser tubes in the condenser, the ferrous ions are injected into the coolant to form the protective film on the inner surfaces of the condenser tubes. Subsequently, the ferrous-ion injecting operation and the sponge-ball cleaning operation are executed while the polarization resistance and heat transfer rate of the condenser tubes are monitored. The injecting and cleaning operations are performed to maintain within suitable ranges the polarization resistance and the heat transfer rate of the condenser tubes. These ranges may vary, depending upon whether the coolant is non-chlorinated seawater, chlorinated seawater, or sulfide-ion polluted seawater.

U.S. Pat. No. 3,984,302, issued Oct. 5, 1976, to Freedman et al, discloses that marine fouling of the tubes of heat exchangers, piping conduits, and like apparatus through which sea water flows is controlled with the aid of an assembly mounted in situ within the system at the inlet ends of the tubes which generates chlorine gas by electrolytic action. The chlorine gas is distributed by the flowing sea water through the tubes and prevents the accumulation of marine plant and animal material on the internal surface of the tubes, thus controlling marine fouling.

The above cited prior art does not provide a solution to the aforementioned problems. Because those skilled in the art have recognized and attempted to solve these problems in the past, they will appreciate the present invention, which addresses these and other problems.

SUMMARY OF THE INVENTION

It is an object of the present invention to provide an improved anti-fouling system and method.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention comprises an antifouling ion injection system for offshore drilling structures.

In one embodiment, an anti-fouling system for an offshore drilling structure may comprise a vertical turbine suction assembly operable for insertion into seawater for drawing seawater into the offshore drilling structure. A basket strainer may be utilized for straining the seawater entering the vertical turbine suction assembly. A treatment cage positioned at an end of the basket strainer and one or more electrodes may be positioned in the basket strainer. Wiring leading to the one or more electrodes may connect to instrumentation for impressing electrical power on the one or more electrodes to produce ions.

The anti-fouling system may further comprise a pump bowl assembly for the vertical turbine suction assembly. In one embodiment, the treatment cage is positioned at an outermost end of the vertical turbine suction assembly such that the treatment cage is distal the basket strainer. The system may further comprise an epoxy filled can containing a portion of the wiring, the epoxy filled can forming the outermost end of the vertical turbine suction assembly In another embodiment, a system in accord with the present invention might comprise elements, such as for example, a seawater header and an electrolysis tank that may be fluidly connected to the seawater header for receiving seawater, which is treated to create treated water. A valve might connect the seawater header to the electrolysis tank. Electrodes may be mounted within the electrolysis tank and connected to instrumentation operable for impressing electrical power on the electrodes to create an ion concentration in the electrolysis tank. A plurality of seawater pumps may typically be utilized in offshore drilling structures for pumping seawater. The plurality of seawater pumps may normally operate or pump at different flow rates and pressures. A plurality of pipes is associated with the plurality of different seawater pumps, whereby the plurality of pipes directs fluid flow at different flow rates and different pressures. Fluid piping connections may be made from the electrolysis tank to the plurality of pipes associated with the plurality of seawater pumps. Valves associated with the plurality of fluid piping connections are preferably controllable by the instrumentation so that the instrumentation controls flow of the treated water into the plurality of pipes. In this way, a selected range of ion concentration is maintained within a plurality of pipes, even though the different pipes operate at different flow rates and different pressures. Controls may include controlling an ion concentration in the electrolysis tank and/or controlling fluid flow through the valves. In one embodiment, the selected range of ion concentration in the plurality of pipes may range from three to 2400 ppb. In one preferred embodiment, the electrodes are replaceable. If desired, the valves connect to respective suction intakes associated with the plurality of seawater pumps and the plurality of pipes associated with the plurality of seawater pumps.

In another embodiment, an anti-fouling system for an offshore drilling structure in seawater may comprise a plurality of seawater pumps and a plurality of seawater pump pipes associated with the seawater pumps that extend from the offshore drilling structure into the seawater. In one embodiment, the plurality of pipes extending into the seawater and the associated plurality of seawater pumps may be retrievable for replacement. On the other hand, a rig seawater piping system for the offshore drilling structure may be welded into position to the offshore drilling structure. One or more interconnections may be made between the seawater piping system and the plurality of seawater pump pipes. At least one ion injector may be positioned and connected to the rig seawater piping system to deliver a range of ions to the rig seawater piping system that is welded into position. The ion injector may be positioned after the one or more interconnections positioned such that ions are delivered only to the rig seawater piping and not to the plurality of seawater pump pipes or the plurality of seawater pumps.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PRESENTLY PREFERRED EMBODIMENTS

The system of the present invention is designed to reliably and safely inhibit marine growth fouling in seawater pump systems on ocean going vessels, offshore platforms, offshore drilling rigs, and shoreline installations. The system of the present invention is based on electrolytic principles that provide an effective method for the prevention of bio-fouling.

Figure 1:
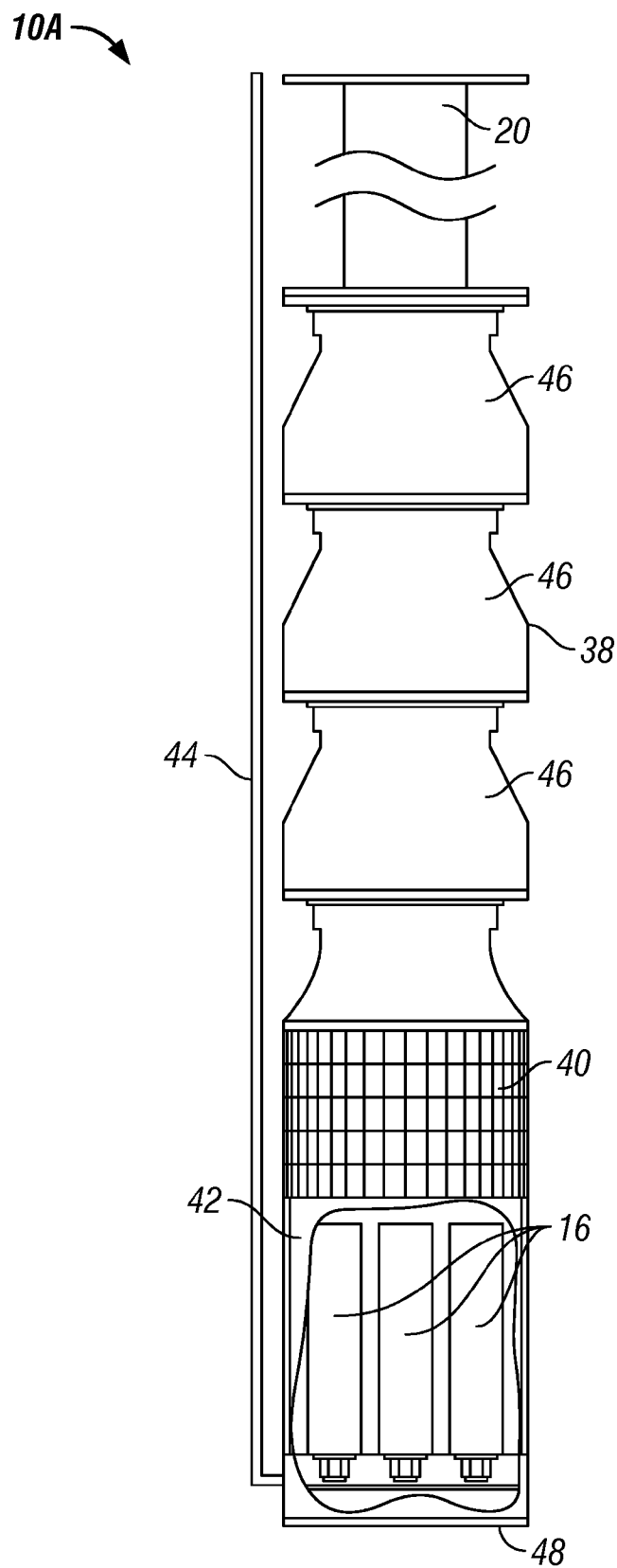
FIG. 1 is a side elevational view, partially in cross-section, of a vertical turbine suction assembly operable for insertion into seawater with a treatment cage at an end of a basket strainer in accord with one possible embodiment of the present invention.
Figure 2:
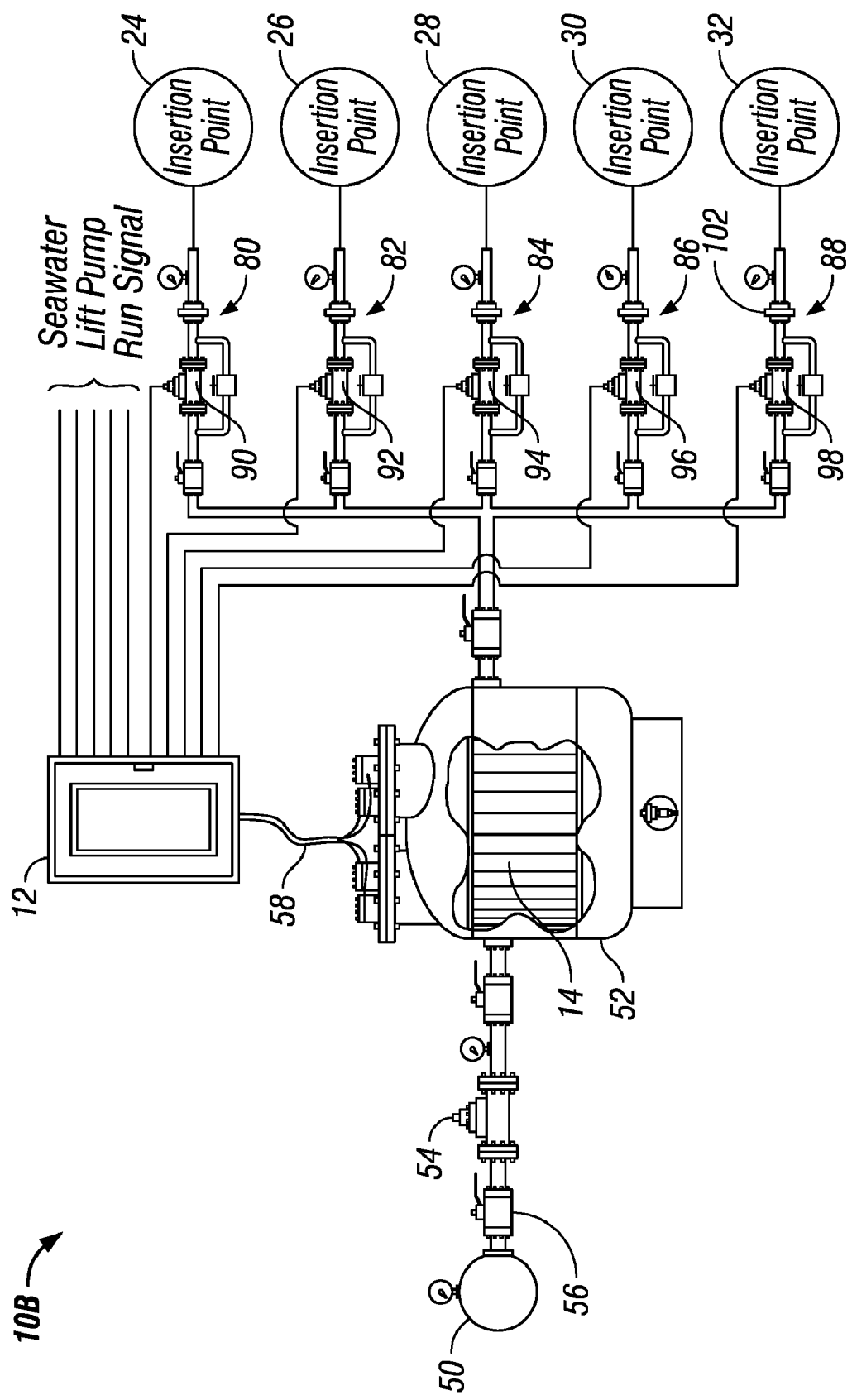
FIG. 2 is a schematic view, partially in cross-section, of an antifouling ion injection system for offshore drilling structures wherein treated water is released to multiple pipe locations at varying rates commensurate to flow rate conditions for the respective location in accord with one possible embodiment of the present invention.
Figure 3:
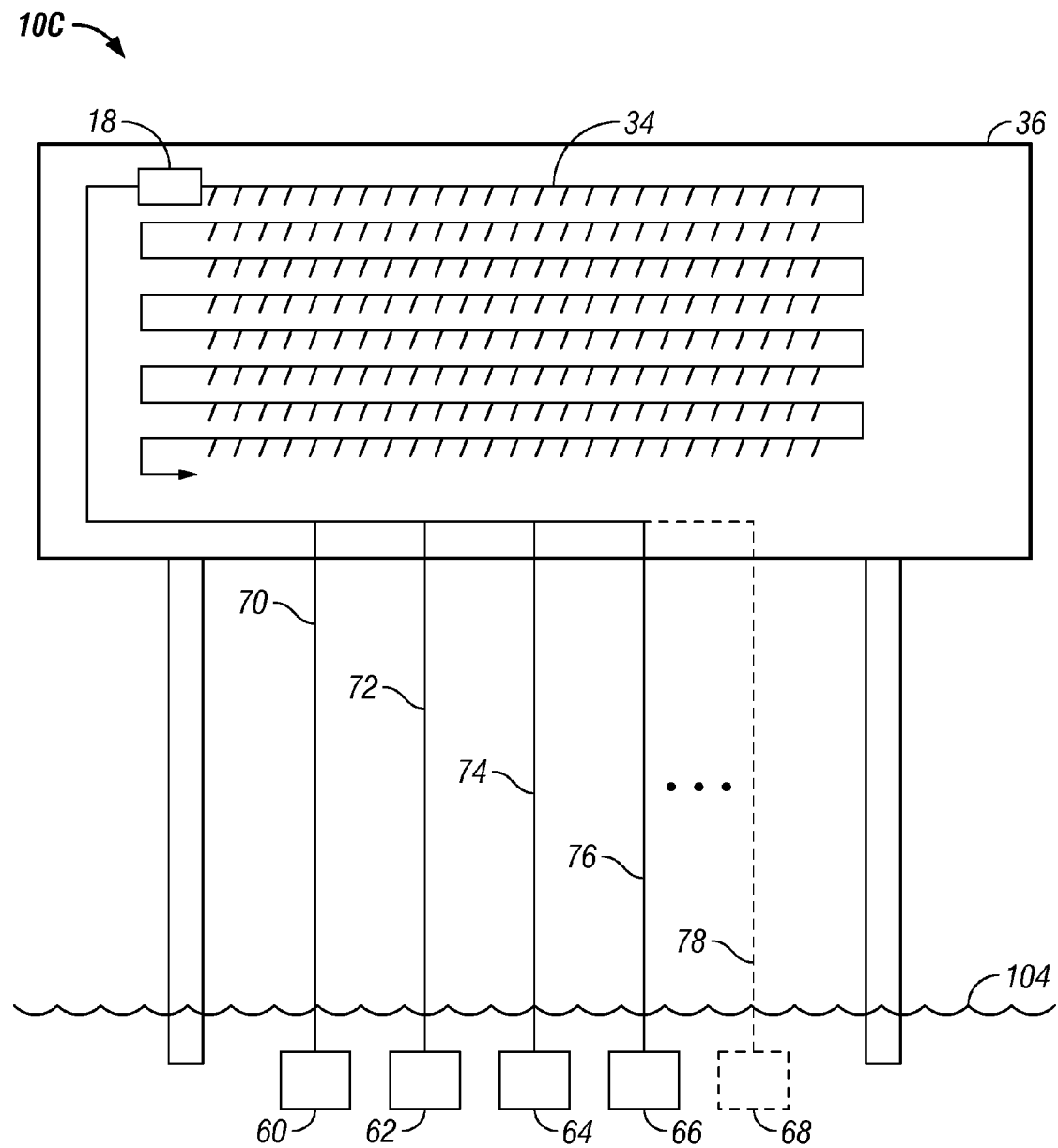
FIG. 3 is a schematic side elevational view, of an offshore drilling structure that utilizes an antifouling ion injection system on selected pipes in accord with one possible embodiment of the present invention.

Referring now generally to the FIGS. 1-3, the present system delivers an impressed DC current from an automated power converting controller panel, such as converting controller panel 12 in FIG. 2, to copper anodes strategically placed in sea chests, strainers, pump intakes, such as anodes 14 in FIG. 2, anodes 16, in FIG. 1, or anodes disposed within in-line system 18 of FIG. 3. The passage of DC current through the anodes causes a release of copper ions into the flow of sea water at a pre-determined rate. The copper ions (which may be at a concentration of less than 25 ppb) deter the entry and growth of fouling organisms downstream from the anodes, such as in vertical delivery pipe 20 in FIG. 1, downstream from the treated water introduction points 24, 26, 28, 30, and 32 in FIG. 2, and/or within essentially non-removable seawater pipe system 34 of offshore drilling structure 36 in FIG. 3.

Upon their return to the open sea, the copper ions disperse and their potency is reduced to levels that are not harmful to sea life. Therefore, the system does not provide a threat to the environment.

Some sets of anodes 14 or 16, which may also be referred to as electrodes, may utilize aluminum anodes (electrodes) in conjunction with the copper anodes (electrodes). The aluminum anodes dissolve simultaneously with the copper anodes, and create a protective film on ferrous sea water systems to inhibit corrosion. Soft iron anodes may also be specified for non-ferrous sea water systems to inhibit corrosion.

Power converting controller panel 12 as shown in FIG. 2 is manufactured to function in a wide variety of applications. The current output regulates the concentration of copper released into the water flow. The current output is adjustable to optimize the efficiency of the system, thus allowing for proper water treatment and maximum anode life. Additionally, panel(s) 12 can be designed to control the anodes, such as those discussed hereinbefore or other anode configurations, in intermittent or continuous duty water systems. When pumps are not running, the converting controller panel(s) 12 automatically reduces the current output to maintain minimum levels of copper dosage. When the pumps start, the converting controller panel 12 increases the current output, bringing the copper dosage to pre-calculated levels based on the flow rate of the pumps.

In a preferred embodiment, the systems conform to codes established by A.S.M.E. in fabrication, NEMA in electrical motors, and all metals used are approved by A.S.T.M.

Accordingly, the present invention comprises an antifouling ion injection system for offshore drilling structures.

In one possible embodiment, an anti-fouling system 10A for an offshore drilling structure may comprise a vertical turbine suction assembly 38 operable for insertion into seawater for drawing seawater into the offshore drilling structure. Basket strainer 40 may be utilized for straining the seawater entering the vertical turbine suction assembly 38. Treatment cage 42 may be positioned at a lower end of basket strainer 40 and one or more anodes 16, which may also be referred to as electrodes, may be positioned in basket strainer 40. Wiring 44 leading to the one or more anodes 16 may connect to instrumentation for impressing electrical power on the one or more anodes 16 to produce metallic ions.

The anti-fouling system may further comprise a pump bowl assembly with a plurality of pump bowls 46 for the vertical turbine suction assembly. In one embodiment, treatment cage 42 is positioned at a lowermost or outermost end 48 of vertical turbine suction assembly 38 such that treatment cage 42 is at a distal end of basket strainer 40 with respect to pump bowls 46. Treatment cage 42 may further comprise an epoxy-filled can containing a portion of wiring 44, wherein the epoxy filled can forms the outermost end of the vertical turbine suction assembly 38.

In another more general embodiment, anti-fouling system 10B shown in FIG. 2 in accord with the present invention might comprise elements, such as for example, seawater header 50 and electrolysis tank 52 that may be fluidly connected to the seawater header 50 for receiving seawater, which is treated to create treated water comprising a high metallic ion concentration. One or more valves such as pressure maintaining valve 54 and other in-line valves 56 might connect the seawater header to the electrolysis tank. Replaceable electrodes 14 may be mounted within electrolysis tank 52 and connected to instrumentation panel 12 via cabling 58 operable for impressing electrical power on the electrodes to create a desired metallic ion concentration in the electrolysis tank.

As shown schematically in FIG. 3, a plurality of seawater pumps may typically be utilized in offshore drilling structure 36 for pumping seawater. For example only, such pumps might include 75 GPM jockey pump 60, 4000 GPM fire pump cassion 62, 4000 GPM fire pump cassion 64, 4200 GPM SWL pump cassion 66, and other pumps which may comprise for example 4200 GPM SWL pump cassion 68, shown schematically in FIG. 3. The plurality of seawater pumps 60, 62, 64, 66, and 68 may normally operate or pump at different flow rates and pressures and at different times. A plurality of pipes 70, 72, 74, 76, 78 may be associated with the plurality of different seawater pumps whereby the plurality of pipes direct fluid flow at different flow rates and different pressures.

Referring again to FIG. 2, fluid piping connections 80, 82, 84, 86, and 88 may be made from the electrolysis tank 52 to treated water introduction points 24, 26, 28, 30, and 32 which may be associated with the plurality of pipes 70, 72, 74, 76, 78 in FIG. 3, and/or associated with pumps 60, 62, 64, 66, and 68 in FIG. 3.

Panel controllable solenoid valves 90, 92, 94, 96, and 98 associated with the plurality of fluid piping connections are preferably controllable by the converting controller panel 12 so that the instrumentation controls flow of the treated water into the plurality of pipes. In this way, a selected range of metallic ion concentration is maintained within a plurality of pipes even though the different pipes operate at different flow rates and different pressures. Flow rates into the treated water introduction points 24, 26, 28, 30, and 32 and/or flow rates through the piping may be measured by various means such as low flow orifice meter 100 and/or main orifice meter 102. Downstream pressure gauges and the like may also be utilized to provide information desired for controlling ion concentration into pipes at various treated water introduction points 24, 26, 28, 30, and 32. If desired, multiple pump inlets may be treated with water from a common tank and controller. The tank and controller may be skid mounted to thereby adapt to various offshore drilling structures.

Converting controller panel 12 may include instrumentation for controlling an ion concentration in electrolysis tank 52 and/or controlling fluid flow through panel controllable solenoid valves 90, 92, 94, 96, and 98. In one embodiment, the selected range of ion concentration in the plurality of pipes may range from three to 2400 ppb. In one preferred embodiment, the electrodes are replaceable. If desired, panel controllable solenoid valves 90, 92, 94, 96, and 98 and fluid piping connections 80, 82, 84, 86, and 88 make connections to respective suction intakes associated with the plurality of seawater pumps and the plurality of pipes associated with the plurality of seawater pumps.

Accordingly, in one embodiment of the invention, converting controller panel 12 is programmed to produce a metallic ion concentration in electrolysis tank 52, determines flow rates in the pipes to which treated water introduction points 24, 26, 28, 30, and 32 connect, and controls the flow rates of treated water into these points. In this way, controllable solenoid valves 90, 92, 94, 96, and 98 are regulated so that the metallic ion concentration within the pipes to be treated is maintained at a desired metallic ion concentration regardless of different flow rates and volumes of flow.

In another embodiment 10C, as schematically represented in FIG. 3, an anti-fouling system for an offshore drilling structure in seawater may comprise a plurality of seawater pumps 60, 62, 64, 66, and 68 and a plurality of seawater pump pipes 70, 72, 74, 76, 78 associated with the seawater pumps that may typically extend more or less vertically from offshore drilling structure 36 into seawater 104. While it is possible to inject metallic ions into one or more of the pumps 60, 62, 64, 66, and 68 or pipes 70, 72, 74, 76, 78 as discussed above, it may be desirable to design the overall system so that these components are retrievable for replacement.

In other words, it may be considered less costly and time consuming to change out this portion of the pumping system on a regular basis rather than attempt to provide anti-fouling protection therein. However, generally offshore drilling structure 36 may comprise essentially non-removable seawater pipe system 34 that is welded into position to the offshore drilling structure. Due to the large amount of welding, costs, and replacement time, this pipe is considered for purposes herein to be non-removable. One or more interconnections may be made between the seawater piping system and the plurality of seawater pump pipes. At least one ion injector 18 may be positioned and connected to the rig seawater piping system of non-removable pipe system 34 to deliver a desired range of ions to the rig seawater piping system. The one or more ion injectors 18 may be positioned downstream from the one or more interconnections positioned such that ions are delivered only to the rig seawater piping and not to the plurality of seawater pump pipes or the plurality of seawater pumps. As well, various treated water introduction points 24, 26, 28, 30, and 32 may connect to the non-removable seawater pipe system 34.

In summary, advantages of the present invention may comprise automatically controlled operation, minimal maintenance, excellent fouling prevention, pre-calculated anode life, fully adjustable output, environmentally safe operation, low initial cost, low operating cost, replaceable anodes, and minimal space requirement. The present invention may be utilized with electric submersible pump packages, horizontal skid mounted electric and diesel engine driven pump packages, vertical turbines, electric, and diesel engine driven pump packages, firewater jockey pump systems, sanitary and potable water pressure sets, multiple pump caissons, and permanent and temporary water curtain pump systems.

Accordingly, the foregoing disclosure and description of the invention is illustrative and explanatory thereof, and it will be appreciated by those skilled in the art, that various changes in the ordering of steps, ranges, hardware, software, and/or attributes and parameters, as well as in the details of the illustrations or combinations of features of the methods and apparatus discussed herein, may be made without departing from the spirit of the invention.

What is claimed is:
1. An antifouling ion injection system for offshore drilling structures, comprising:
  a seawater header;
  an electrolysis tank being fluidly connected to said seawater header for receiving seawater, which is treated to create treated water;
  a first valve connecting said seawater header to said electrolysis tank;
electrodes mounted within said electrolysis tank;
  instrumentation operable for impressing electrical power on said electrodes to create an ion concentration in said electrolysis tank;
  a plurality of seawater pumps for pumping seawater, said plurality of seawater pumps being operable for pumping at different flow rates and pressures with respect to each other, said instrumentation being operably connected to run signals for said plurality of sea water pumps to indicate individual pumping rate changes for each of said plurality of sea water pumps;
  a plurality of pipes associated with said plurality of seawater pumps whereby said plurality of pipes are operable for directing fluid flow at said different flow rates and different pressures;

a plurality of fluid piping connections from said electrolysis tank operable to carry metallic ion treated water to said plurality of pipes associated with said plurality of seawater pumps;

a plurality of ion concentration control valves and meters associated with said plurality of fluid piping connections controllable by said instrumentation, said instrumentation being operable for controlling flow of said metallic ion treated water into said plurality of pipes such that a selected range of ion concentration is maintained within plurality of pipes at said different flow rates and said different pressures and for pumping rate changes by controlling an ion concentration in said electrolysis tank and by controlling fluid flow through said plurality of ion concentration control valves, said instrumentation being operable for varying power to said electrodes and operating said plurality of ion concentration control valves in response to said run signals.

2. The system of claim 1, wherein said selected range of ion concentration in said plurality of pipes ranges from 3 to 2400 ppb.

3. The system of claim 1, wherein said electrodes are replaceable.

4. The system of claim 1, wherein said valves connect to respective suction intakes associated with said plurality of seawater pumps and said plurality of pipes associated with said plurality of seawater pumps.

5. A method for making an antifouling ion injection system for offshore drilling structures, comprising:

providing an electrolysis tank with electrodes therein that is fluidly connectable to a seawater header for receiving seawater, which is treated in said electrolysis tank to create treated water;

providing instrumentation operable for impressing electrical power on said electrodes to create an ion concentration in said electrolysis tank which varies responsively to output of said treated water from said electrolysis tank and for increasing and decreasing the flow of said treated water from said electrolysis tank in response to operational changes in each of a plurality of seawater pumps wherein said operational changes being indicated by run signals for said plurality of sea water pumps which indicate pumping rate changes for each of said plurality of sea water pumps, said instrumentation being programmed for controlling a plurality of valves and monitoring a plurality of meters to adjust a flow of said treated water through a plurality of pipes associated with said plurality of seawater pumps whereby said plurality of pipes are operable for directing fluid flow at said different flow rates and different pressures in response to said run signals.

6. The system of claim 1, programming said instrumentation for maintaining said selected range of ion concentration in said plurality of pipes ranges from 3 to 2400 ppb.

7. The system of claim 1, providing that said electrodes are replaceable.

8. The system of claim 1, providing that said valves connect to respective suction intakes associated with said plurality of seawater pumps and said plurality of pipes associated with said plurality of seawater pumps.

* * * * *